United States Patent
Park (10) Patent No.: US 12,045,944 B2
(45) Date of Patent: *Jul. 23, 2024

(54) COLORED THREE-DIMENSIONAL DIGITAL MODEL GENERATION

(71) Applicant: eBay Korea Co. Ltd., Seoul (KR)

(72) Inventor: Yo Han Park, Seoul (KR)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,625

(22) Filed: Jul. 13, 2022

(65) Prior Publication Data
US 2022/0343616 A1 Oct. 27, 2022

Related U.S. Application Data

(63) Continuation of application No. 16/928,138, filed on Jul. 14, 2020, now Pat. No. 11,423,631, which is a
(Continued)

(51) Int. Cl.
*G06T 19/20* (2011.01)
*G06F 16/583* (2019.01)
(Continued)

(52) U.S. Cl.
CPC .......... *G06T 19/20* (2013.01); *G06F 16/5838* (2019.01); *G06Q 30/0643* (2013.01);
(Continued)

(58) Field of Classification Search
CPC ......... G06T 19/20; G06T 15/04; G06T 15/08; G06T 15/205; G06T 13/40; G06T 17/00;
(Continued)

(56) References Cited

U.S. PATENT DOCUMENTS 7,272,264 B2 9/2007 Elshishiny
7,538,764 B2 5/2009 Salomie
(Continued)

FOREIGN PATENT DOCUMENTS

CN 201780606 3/2011
CN 105094725 B 11/2015
(Continued)

OTHER PUBLICATIONS

WSP, "Amazon Just Found a Way to Let You See Inside the Box Without Opening It (AMZN)", 2016, WayBackMachine (Year: 2016).*
(Continued)

*Primary Examiner* — YuJang Tswei
(74) *Attorney, Agent, or Firm* — FIG. 1 Patents (57) ABSTRACT

Colored three-dimensional digital model generation techniques and systems are described. In one example, scanning techniques are employed by a scanning system that scans a physical object while disposed within packaging to form a three-dimension digital model. A model coloring system is employed to color the three-dimensional digital model. A two-dimensional digital image is employed that captures the same or similar physical object. In one example, features of the model are matched to the image. This is then used to align a viewing perspective with respect to the model with a viewing perspective of the object within the digital image, e.g., to find which "view" of the model corresponds with the image. The color is then applied from the digital image to the model, e.g., from pixels of the image to corresponding points in the model.

20 Claims, 10 Drawing Sheets
(7 of 10 Drawing Sheet(s) Filed in Color)

Related U.S. Application Data continuation of application No. 15/996,289, filed on Jun. 1, 2018, now Pat. No. 10,740,983.

(51) Int. Cl.
| | |
|---|---|
| *G06Q 30/0601* | (2023.01) |
| *G06T 13/40* | (2011.01) |
| *G06T 15/04* | (2011.01) |
| *G06T 15/08* | (2011.01) |
| *G06T 15/20* | (2011.01) |
| *G06T 17/00* | (2006.01) |

(52) U.S. Cl.
CPC .............. *G06T 15/04* (2013.01); *G06T 15/08* (2013.01); *G06T 15/205* (2013.01); *G06T 13/40* (2013.01); *G06T 17/00* (2013.01); *G06T 2219/2012* (2013.01)

(58) Field of Classification Search
CPC ........ G06T 2219/2012; G06F 16/5838; G06Q 30/0643
See application file for complete search history.

(56) References Cited

U.S. PATENT DOCUMENTS

| | | | |
|---|---|---|---|
| 7,558,439 B2 | 7/2009 | Weese et al. | |
| 8,253,746 B2 | 8/2012 | Geisner et al. | |
| 8,340,245 B2 | 12/2012 | Herrnaz et al. | |
| 9,292,961 B1 | 3/2016 | Korchev et al. | |
| 9,686,481 B1 | 6/2017 | Graybill et al. | |
| 9,799,147 B1* | 10/2017 | Chehadeh ............... | G09B 11/00 |
| 10,192,115 B1 | 1/2019 | Sheffield et al. | |
| 10,607,413 B1 | 3/2020 | Marcolina et al. | |
| 10,699,421 B1* | 6/2020 | Cherevatsky .......... | G06V 20/52 |
| 10,740,983 B2 | 8/2020 | Park | |
| 10,878,623 B2* | 12/2020 | Blackley ................ | G02B 30/40 |
| 11,529,762 B2* | 12/2022 | Bigos ..................... | B33Y 50/02 |
| 11,654,633 B2* | 5/2023 | Bigos ..................... | B33Y 50/02 |
| | | | 700/98 |
| 2004/0227752 A1 | 11/2004 | McCartha et al. | |
| 2005/0069682 A1* | 3/2005 | Tseng .................. | G05B 19/4099 |
| | | | 428/195.1 |
| 2005/0226527 A1 | 10/2005 | Weese et al. | |
| 2007/0217672 A1 | 9/2007 | Shannon et al. | |
| 2008/0219538 A1 | 9/2008 | Gering | |
| 2009/0034790 A1 | 2/2009 | Song et al. | |
| 2012/0093367 A1* | 4/2012 | Gudmundson ...... | G01V 5/0008 |
| | | | 382/103 |
| 2012/0177284 A1 | 7/2012 | Wang | |
| 2012/0242790 A1* | 9/2012 | Sandrew ............. | H04N 13/257 |
| | | | 348/43 |
| 2013/0188830 A1 | 7/2013 | Ernst et al. | |
| 2013/0249901 A1 | 9/2013 | Sweet et al. | |
| 2013/0250050 A1* | 9/2013 | Kanaujia .............. | H04N 13/106 |
| | | | 348/42 |
| 2014/0114461 A1 | 4/2014 | Hermary et al. | |
| 2015/0172637 A1* | 6/2015 | Yoon ........................ | G06T 17/00 |
| | | | 348/46 |
| 2015/0178988 A1 | 6/2015 | Mora et al. | |
| 2015/0206345 A1 | 7/2015 | Chang et al. | |
| 2015/0046291 A1 | 11/2015 | Archambault | |
| 2015/0332498 A1 | 11/2015 | Zhang et al. | |
| 2015/0348312 A1* | 12/2015 | Nowak .................... | G06F 30/00 |
| | | | 345/420 |
| 2015/0363971 A1 | 12/2015 | Pan et al. | |
| 2016/0012646 A1* | 1/2016 | Huang .................... | G06T 5/005 |
| | | | 345/419 |
| 2016/0124934 A1 | 5/2016 | Greenberg et al. | |
| 2016/0189288 A1 | 6/2016 | Todeschini et al. | |
| 2016/0198142 A1* | 7/2016 | Sandrew .............. | H04N 13/266 |
| | | | 386/278 |
| 2016/0206203 A1 | 7/2016 | Yu et al. | |
| 2016/0239080 A1 | 8/2016 | Marcolina et al. | |
| 2017/0032579 A1 | 2/2017 | Eisemann et al. | |
| 2017/0106591 A1* | 4/2017 | Tabayashi ............. | B33Y 10/00 |
| 2017/0132485 A1* | 5/2017 | Ying ........................ | G06T 15/20 |
| 2017/0154474 A1 | 6/2017 | Woo et al. | |
| 2017/0320346 A1* | 11/2017 | Zhou ..................... | B41M 5/0088 |
| 2017/0323376 A1 | 11/2017 | Glaser et al. | |
| 2018/0089819 A1 | 3/2018 | Jimenez | |
| 2018/0095450 A1* | 4/2018 | Lappas .................. | B22F 10/80 |
| 2018/0114264 A1* | 4/2018 | Rafii ....................... | G06T 15/50 |
| 2018/0114363 A1* | 4/2018 | Rosenbaum ......... | H04N 13/207 |
| 2018/0144458 A1* | 5/2018 | Xu ........................ | H04N 13/271 |
| 2018/0342109 A1* | 11/2018 | Hamidi-Rad ........ | A61B 5/1071 |
| 2019/0371078 A1 | 12/2019 | Park | |
| 2020/0342688 A1 | 10/2020 | Park | |
| 2021/0182983 A1* | 6/2021 | Jalla ....................... | G06F 30/20 |

FOREIGN PATENT DOCUMENTS

| | | |
|---|---|---|
| EP | 2381421 | 10/2011 |
| KR | 20160001699 A | 1/2016 |
| WO | WO-2017158592 | 9/2017 |
| WO | 2018017626 A2 | 1/2018 |
| WO | WO-2019231740 | 12/2019 |

OTHER PUBLICATIONS 10-2020-7030266, "Notice of Allowance", KR Application No. 10-2020-7030266, Aug. 24, 2022, 8 pages.

10-2020-7030266, "Office Action received for Korean Patent Application No. 10-2020-7030266, mailed on Feb. 15, 2022", Feb. 15, 2022, 7 Pages.

U.S. Appl. No. 15/996,289, "Applicant Interview summary received for U.S. Appl. No. 15/996,289 mailed on Sep. 25, 2019", Sep. 25, 2019, 3 Pages.

U.S. Appl. No. 15/996,289, "Applicant Interview summary received for U.S. Appl. No. 15/996,289, mailed on Mar. 2, 2020", Mar. 2, 2020, 3 Pages.

U.S. Appl. No. 15/996,289, "Final Office Action", U.S. Appl. No. 15/996,289, filed Jan. 15, 2020, 27 pages.

U.S. Appl. No. 15/996,289, "Non-Final Office Action", U.S. Appl. No. 15/996,289, filed Aug. 5, 2019, 21 pages.

U.S. Appl. No. 15/996,289, "Notice of Allowance", U.S. Appl. No. 15/996,289, filed Apr. 2, 2020, 8 pages.

U.S. Appl. No. 15/996,289, "Response to Final Office Action filed on Mar. 9, 2020 for U.S. Appl. No. 15/996,289, mailed on Jan. 15, 2020", Mar. 9, 2020, 15 Pages.

U.S. Appl. No. 15/996,289, "Response to Non-Final Office Action Filed on Oct. 29, 2019, for U.S. Appl. No. 15/996,289, mailed on Aug. 5, 2019", Oct. 29, 2019, 16 Pages.

U.S. Appl. No. 16/928,138, "Corrected Notice of Allowability", U.S. Appl. No. 16/928,138, filed May 20, 2022, 2 pages.

U.S. Appl. No. 16/928,138, "Final Office Action Received for U.S. Appl. No. 16/928,138, mailed on Mar. 10, 2021", Mar. 10, 2021, 34 Pages.

U.S. Appl. No. 16/928,138, "Final Office Action Received for U.S. Appl. No. 16/928,138, mailed on Oct. 20, 2021", Oct. 20, 2021, 38 Pages.

U.S. Appl. No. 16/928,138, "Non Final Office Action Received for U.S. Appl. No. 16/928,138, mailed on May 12, 2021", May 12, 2021, 35 Pages.

U.S. Appl. No. 16/928,138, "Non Final Office Action Received for U.S. Appl. No. 16/928,138, mailed on Jan. 5, 2022", Jan. 5, 2022, 35 Pages.

U.S. Appl. No. 16/928,138, "Non Final Office Action Received for U.S. Appl. No. 16/928,138, mailed on Nov. 25, 2020", Nov. 25, 2020, 30 Pages.

U.S. Appl. No. 16/928,138, "Notice of Allowance", U.S. Appl. No. 16/928,138, filed Apr. 13, 2022, 8 pages.

19731017.0, "Communication pursuant to Article 94(3) EPC", EU Application No. 19731017.0, Aug. 22, 2022, 6 pages.

Lumencandela, "3.1 Position, Displacement, and Average Velocity", lumencandela, 20130215 (Year: 2013), 2013, 11 Pages.

(56) References Cited

OTHER PUBLICATIONS

PCT/US2019/033163, "International Preliminary Report on Patentability Received for Application No. PCT/US2019/033163, mailed on Dec. 10, 2020", Dec. 10, 2020, 9 Pages.
PCT/US2019/033163, "International Search Report and Written Opinion", Application No. PCT/US2019/033163, Sep. 30, 2019, 13 pages.
Willis, et al., "InfraStructs: Fabricating Information Inside Physical Objects for Imaging in the Terahertz Region", 2013, ACM (Year: 2013), 2013, 10 pages.
"10-2022-7040296", Office Action received for Korean Patent Application No. 10-2022-7040296, Jul. 25, 2023, 7 pages.
19731017.0, "Communication Pursuant to Article 94(3) EPC Received for European Patent Application No. 19731017.0, mailed on May 26, 2023", May 26, 2023, 6 pages.
10-2022-7040296, "Foreign Office Action", KR Application No. 10-2022-7040296, Jan. 29, 2024, 5 pages.
201980036853.1, "Foreign Office Action", CN Application No. 201980036853.1, Feb. 7, 2024, 11 pages.

* cited by examiner

COLORED THREE-DIMENSIONAL DIGITAL MODEL GENERATION

RELATED APPLICATIONS

This application is a continuation of and claims priority to U.S. patent application Ser. No. 16/928,138, filed on Jul. 14, 2020, which is a continuation of and claims priority to U.S. patent application Ser. No. 15/996,289, filed on Jun. 1, 2018, the disclosures of which are incorporated in their entirety by reference here.

BACKGROUND

Three-dimensional digital models have been developed to increase the ways in which a user may interact with digital content via a computing device. A three-dimensional digital model, for instance, may be configured to support user interaction to change a perspective used to view the model by the computing device. As a result, user interaction via the computing device with the three-dimensional digital model may mimic in a way in which the user interactions occur with respect to an actual physical object. This acts to increase richness in user interaction over two-dimensional digital images in that the user may efficiently navigate between these perspectives in a non-modal manner, as opposed to navigating between different views supported by different two-dimensional digital images.

Conventional techniques used to create three-dimensional digital models, however, are complicated, computationally expensive, and typically involve significant amounts of user interaction and expertise, thus making these conventional techniques unavailable to average users. Additionally, formation of the model may in some instances harmfully impact a user's intent in creation of the model. For instance, suppose a user wishes to sell a vintage toy in its original packaging. Inclusion of the toy in the packaging oftentimes increases a monetary value of the toy as a whole. Therefore, use of a conventional modeling technique that involves removal of the toy from the packaging may adversely impact this monetary value and run counter to the user's wishes in selling the toy. Accordingly, conventional modeling techniques may not be available to the user, such as to provide a three-dimensional digital model as part of digital content offering the toy for sale.

SUMMARY

Colored three-dimensional digital model generation techniques and systems are described. In one example, scanning techniques are employed by a scanning system that scans a physical object while disposed within packaging to form a three-dimension digital model. A model coloring system is employed to color the three-dimensional digital model. To do so, a two-dimensional digital image is employed that captures the same or similar physical object. A variety of techniques are usable to apply color of the digital image to the model. In one example, features of the model are matched to the image. This is then used to align a viewing perspective with respect to the model with a viewing perspective of the object within the digital image, e.g., to find which "view" of the model corresponds with the image. The color is then applied from the digital image to the model, e.g., from pixels of the image to corresponding points in the model. In one example, distortion techniques are used to stretch and compress corresponding portions of the digital image to supply this color. Other examples include stereo matching of uncolored portions of the initial version of the model to colored portions of the initial version, patch matching techniques, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The detailed description is described with reference to the accompanying figures. Entities represented in the figures may be indicative of one or more entities and thus reference may be made interchangeably to single or plural forms of the entities in the discussion.

DETAILED DESCRIPTION

Overview

Conventional techniques used to create three-dimensional digital models are complicated, computationally expensive, and typically involve significant amounts of user interaction and expertise. This causes these conventional techniques unavailable to average users. Additionally, formation of the three-dimensional digital model may in some instances harmfully impact a user's intent in creation of the model, e.g., may require removal from packaging that may adversely affect a value of a physical object that is to be modeled.

Accordingly, colored three-dimensional digital model generation techniques and systems are described. In one example, scanning techniques are employed by a scanning system that scans a physical object while disposed within packaging. Examples of such scanning techniques include X-ray techniques which generate scanning data as a series of "slices" which are then formed together to generate a three-dimensional digital model of the physical object, directly. Indirect examples are also contemplated in which the scanning data is used to identify a three-dimensional digital model that was previously generated.

Once the three-dimensional digital model is obtained, a model coloring system is employed to color the three-dimensional digital model. To do so, a two-dimensional digital image is employed. In one example, the two-dimensional digital image is provided to the system by a user that initiated the model generation process. The digital image, for instance, may capture a view of the same or similar physical object that is a subject of the model. In another example, the two-dimensional digital image is obtained via a search based at least in part on a search query generated from the three-dimensional digital model, e.g., through shape matching.

Once the two-dimensional digital image is obtained, a variety of techniques are usable to apply color to the digital image to the model. In one example, features of the model are matched to the image. This is then used to align a viewing perspective with respect to the model with a viewing perspective of the object within the digital image, e.g., to find which "view" of the model corresponds with the image. The color is then applied from the digital image to the model, e.g., from pixels of the image to corresponding points in the model.

In some instance, some portions of the model are not viewable in the digital image and are thus not colored in an initial version of the model. Accordingly, techniques may also be employed to color these portions. In one example, distortion techniques are used to stretch and compress corresponding portions of the digital image to supply this color. Other examples include stereo matching of uncolored portions of the initial version of the model to colored portions of the initial version, patch matching techniques, and so forth. In this way, even though a single perspective of the object may be captured by the digital image, this perspective may still be used by the color generation system to provide colors for "unseen" portions of the model. Other examples are also contemplated, such as linear blend skinning.

The colored three-dimensional digital model of the physical object may then be used to support a variety of functionality. A seller, for instance, may wish to offer a physical object within packaging for sale. To do so, the seller interacts with a service provider system to initiate generation of digital content indicating the physical object is available for sale, a two-dimensional digital image of the same or similar physical object, a purchase price, and having functionality that is selectable by a buyer to initiate purchase of the physical object.

The seller then ships the physical object, within the packaging, to a fulfillment center. The fulfillment center includes a scanning system including a three-dimensional scanning device that is usable to generate a three-dimensional digital model. The three-dimensional scanning device is configured to generate scanning data that is used to form the model without removing the physical object from the packaging, thus preserving human and operational resources as well as preserving potentially desirable packaging.

A model coloring system at the fulfillment center is then used to color the three-dimensional digital model based at least in part on the two-dimensional digital image supplied by the seller. In this way, a colored three-dimensional digital model may be readily generated for inclusion as part of the digital content, e.g., the offer to sell the physical object. As a result, the digital content may include a colored three-dimensional digital model without removing the physical object from the packaging, which is not possible using conventional techniques. Other examples are also contemplated, further discussion of which may be found in the following sections and is shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
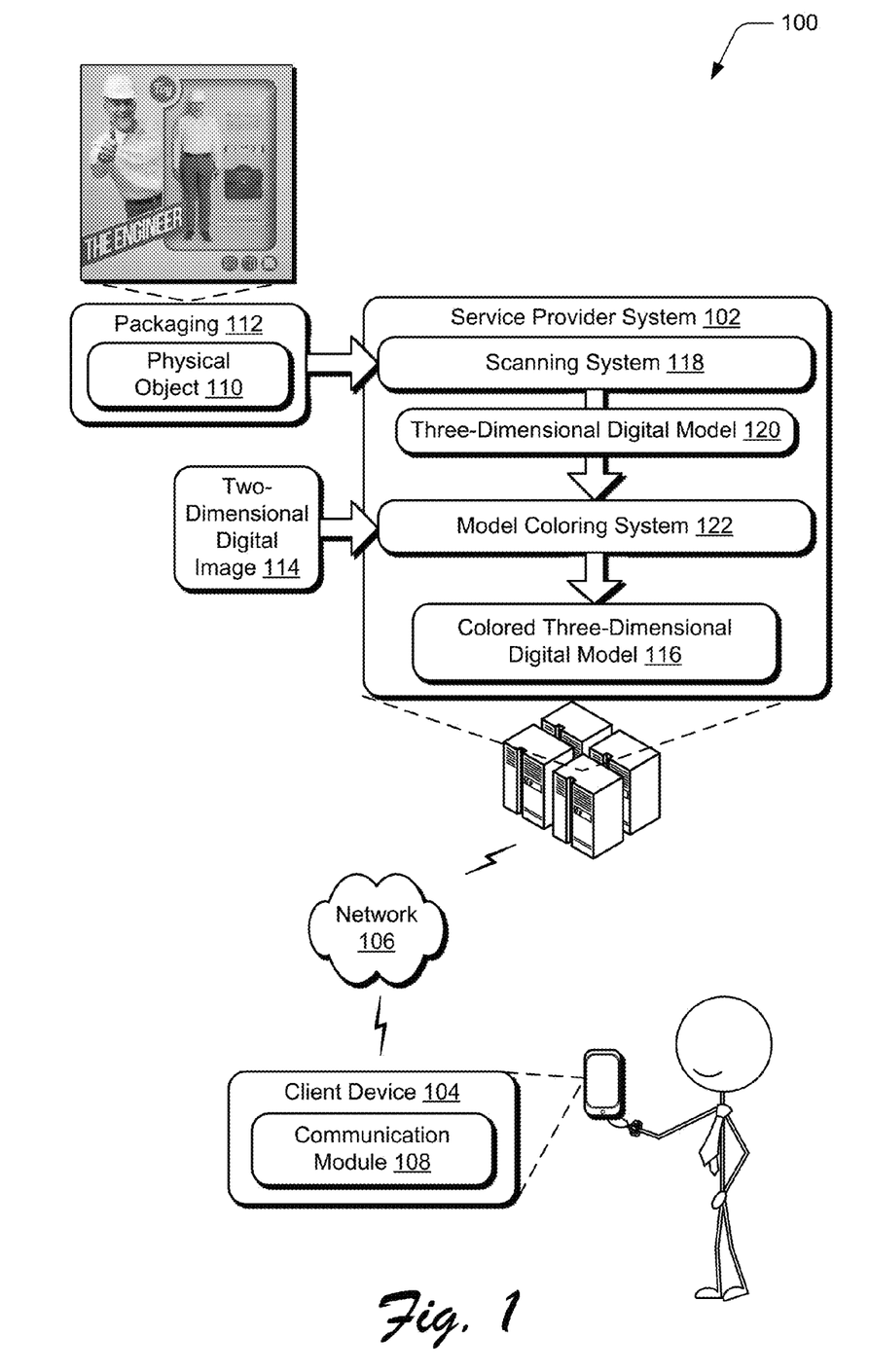
FIG. 1 is an illustration of an environment in an example implementation that is operable to employ colored three-dimensional digital model generation techniques described herein.

FIG. 1 is an illustration of a digital medium environment 100 in an example implementation that is operable to employ model generation techniques described herein. The illustrated environment 100 includes a service provider system 102 and a client device 104 of a user that are communicatively coupled, one to another, via a network 106. The client device 104, for instance, may include a communication module 108 that is configured to access functionality of the service provider system 102 via the network 106. The communication module 108 may be configured in a variety of ways, such as a browser, mobile application, and so forth. Computing devices that implement the service provider system 102 and the client device 104 may also be configured in a variety of ways.

A computing device, for instance, may be configured as a desktop computer, a laptop computer, a mobile device (e.g., assuming a handheld configuration such as a tablet or mobile phone as illustrated for the client device 104), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as illustrated for the service provider system 102 and as described in relation to FIG. 9.

The service provider system 102 is configured in this example to process a physical object 110 within packaging 112 and a two-dimensional digital image 114 to form a colored three-dimensional digital model 116. To do so, a scanning system 118 is employed to generate a three-dimensional digital model 120, e.g., through use of X-ray techniques. Although the scanning system 118 is implemented by the service provider system 102 in this example, the scanning system 118 may also be configured as a "stand alone" unit for use by a user, directly. A model coloring system 122 is employed to color the three-dimensional digital model 120 using a two-dimensional digital image 114 thereby forming the colored three-dimensional digital model 116. In this way, the model may be formed from the physical object 110 without removal from the packaging 112, thereby improving efficiency in that repackaging of the physical object 110 is not required and may also be used to preserve potentially valuable packaging.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Colored Three-Dimensional Digital Model Generation

Figure 2:
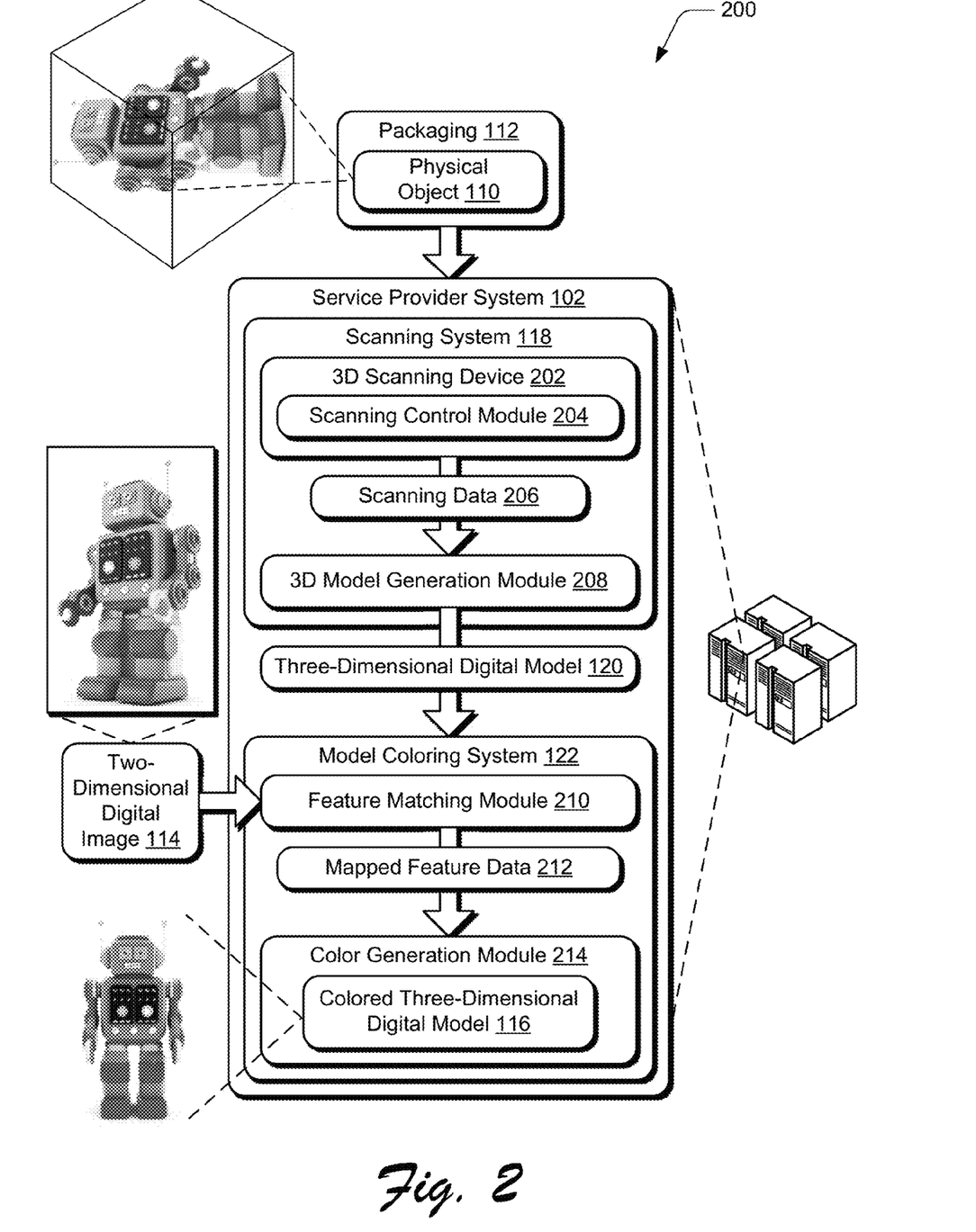
FIG. 2 depicts operation of a scanning system and model color system of FIG. 1 in greater detail.

FIG. 2 depicts a system 200 showing operation of the scanning system 118 and model coloring system 122 of FIG. 1 in greater detail. FIGS. 3-7 depict further examples of operation of the scanning system and model coloring system of FIG. 2. FIG. 8 depicts a procedure 800 in an example implementation in which a three-dimensional digital model formed by scanning a physical object through packaging is colored using a two-dimensional digital image.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 2-8 interchangeably.

To begin, a physical object 110 contained within packaging 112 is received by the service provider system 102. The packaging 112 may partially obstruct an ability to view of the physical object 110 as shown in FIG. 1 or even fully obstruct an ability to view the physical object 110 as shown in FIG. 2. Accordingly, a 3D scanning device 202 including a scanning control module 204 is configured to generate scanning data 206, through the packaging 112, that describes the physical object 110.

Figure 3:
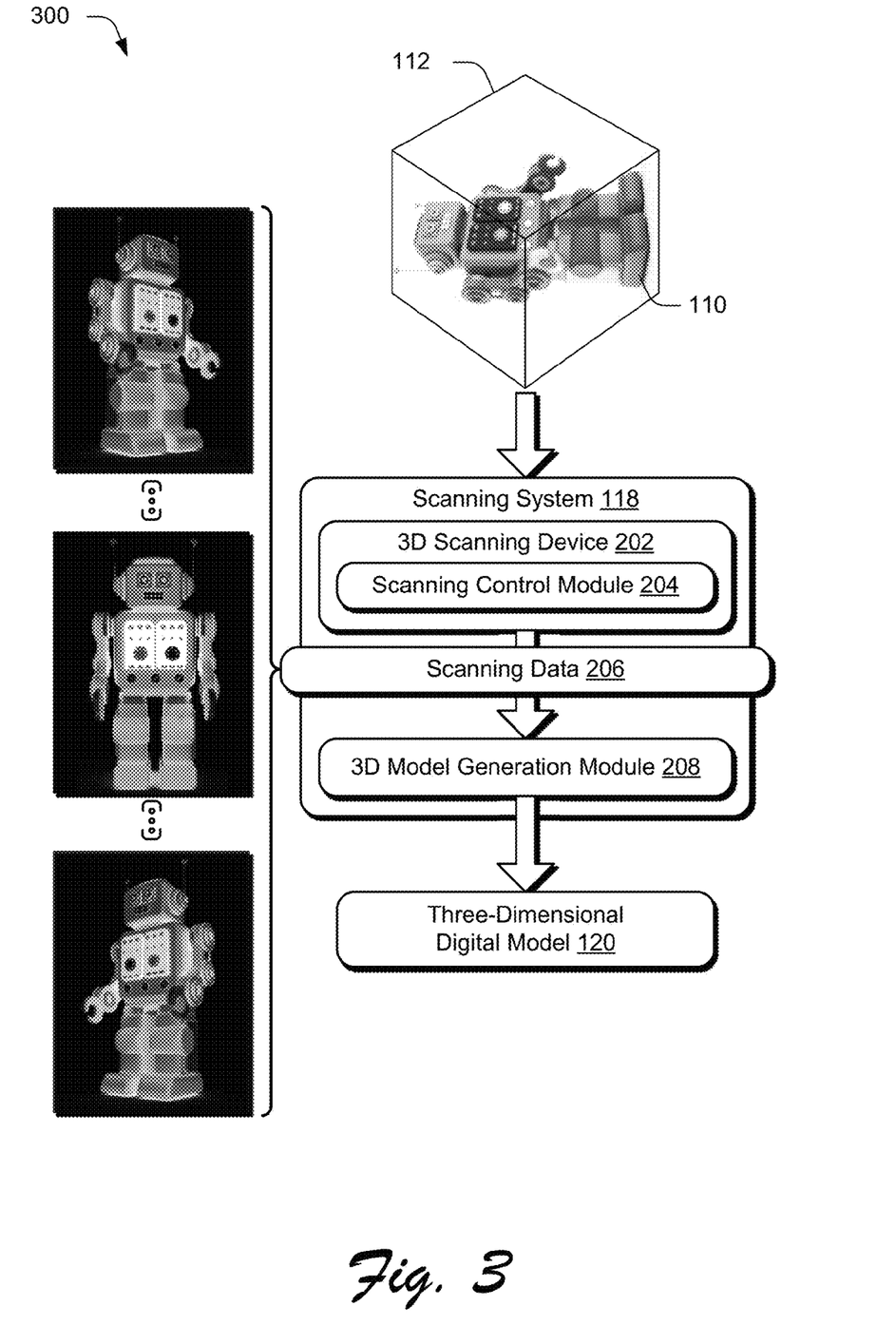
FIG. 3 depicts operation of a scanning system of FIG. 2 in greater detail as generating a three-dimensional digital model by scanning a physical object through packaging.

As shown in an example implementation 300 of FIG. 3, for instance, the scanning data 206 may capture a variety of views/perspectives of the physical object 110 through the packaging 112. The 3D scanning device 202, for instance, may be configured to generate the scanning data 206 as a collection of two-dimensional X-ray images. The scanning data 206 is able to capture views of the physical object 110 through the packaging 112 because the physical object 110 has a material density that is greater than a material density of the packaging. In one example, densities of packaging materials (e.g., vinyl, Styrofoam, paper, and so on) are estimated, which may then be removed automatically and without user intervention from the scanning data 206 by the system. Other examples are also contemplated, including computed tomography, magnetic resonance imaging, and so forth.

The scanning data 206 that results from a scan of the physical object 110 within the packaging 112 is then received by a three-dimensional digital model generation module 208 (block 802). The three-dimensional digital model generation module 208 is configured to generate a three-dimensional digital model 120 the physical object based on the received scanning data (block 804). The three-dimensional digital model 120, for instance, may be formed as a discrete 3D volumetric representation of the physical object 110 from the scanning data 206 captured from the different perspectives using a variety of techniques, such as an isosurface extraction algorithm.

Thus, at this point the scanning system 118 outputs a three-dimensional digital model 120 of the physical object 110. Because the three-dimensional digital model 120 is formed of the physical object 110 through the packaging 112, the model is not colored. Accordingly, a model coloring system 122 is then employed to color the three-dimensional digital model 120. This may be performed in a variety of ways.

In the illustrated example of FIG. 2, a two-dimensional digital image 114 is received (block 806) of the same or similar physical object 110 by the model coloring system 122 along with the there-dimensional model 120 from the scanning system 118. A user that provided the physical object 110 and packaging 112 to the service provider system 102, for instance, may also provide the two-dimensional digital image 114. In another example, the two-dimensional digital image 114 is obtained by the model coloring system 122 based on an image search, e.g., to find a two-dimensional digital image 114 based on a shape of the three-dimensional digital model 120.

A feature matching module 210 is then employed to detect features of the two-dimensional digital image 114 that correspond to features of the three-dimensional digital model 120 (block 808), which is output as mapped feature data 212. As shown in the example implementation 400 of FIG. 4, the feature matching module 210 may generate the mapped feature data 212 in a variety of ways. The feature matching module 210, for instance, may form abstractions of information in the two-dimensional digital image 114 and the three-dimensional digital model 120 to make local decisions (e.g., at a pixel level) whether a feature is included at the location, and if so, whether that feature may also be found in the model, and vice versa. This may be performed using edge detection, corners and points of interest, through blob detection, and so forth. Edges are points formed as a boundary between two image regions, e.g., through gradient detection, such as between different parts of the illustrated toy robot. Corners and points of interest refer to point-like features in an image that have a local two-dimensional structure, e.g., the buttons on the chest of the toy robot. Blobs provide a description of structure included in the image as regions (e.g., the feet of the toy robot), as contrasted with the corners in the previous example.

Figure 4:
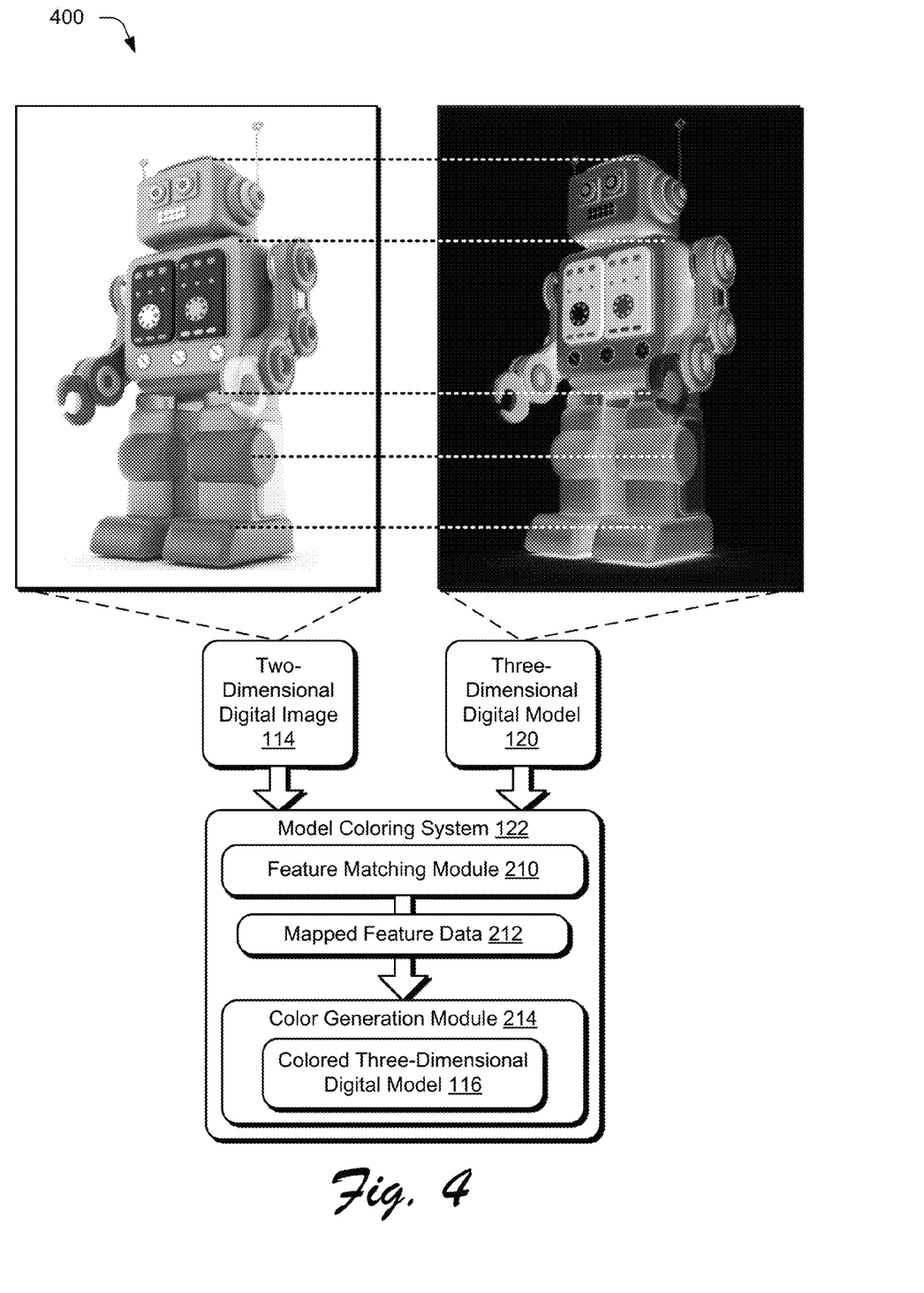
FIG. 4 depicts operation of a model coloring system as employing feature matching between a two-dimensional digital image and the three-dimensional digital model generated in FIG. 3.

This may also be used to modify position of scanned images and/or the three-dimensional digital model 120. For example, points may be identified in the physical object that may move, e.g., flex, rotate, hinged, and so forth. By identifying the relevant points of these different parts (e.g., through object recognition), the three-dimensional digital model 120 may be mapped to the two-dimensional digital image, even if in different poses, or vice versa. For example, the illustrated robot may be included in packaging with arms and legs positioned straight, which are then mapped to a three-dimensional digital model 120 with the arms outstretched. This may include an ability of the system and/or user to modify the model once formed, e.g., to reposition the appendages. This may also include an ability to include accessories as part of the model, e.g., a sword included in the packaging to be held in the hand of the robot. This functionality may be implemented manually through user interaction with a user interface and/or automatically and without user intervention by the system, e.g., based on an image repository of other digital images and/or models.

Figure 5:
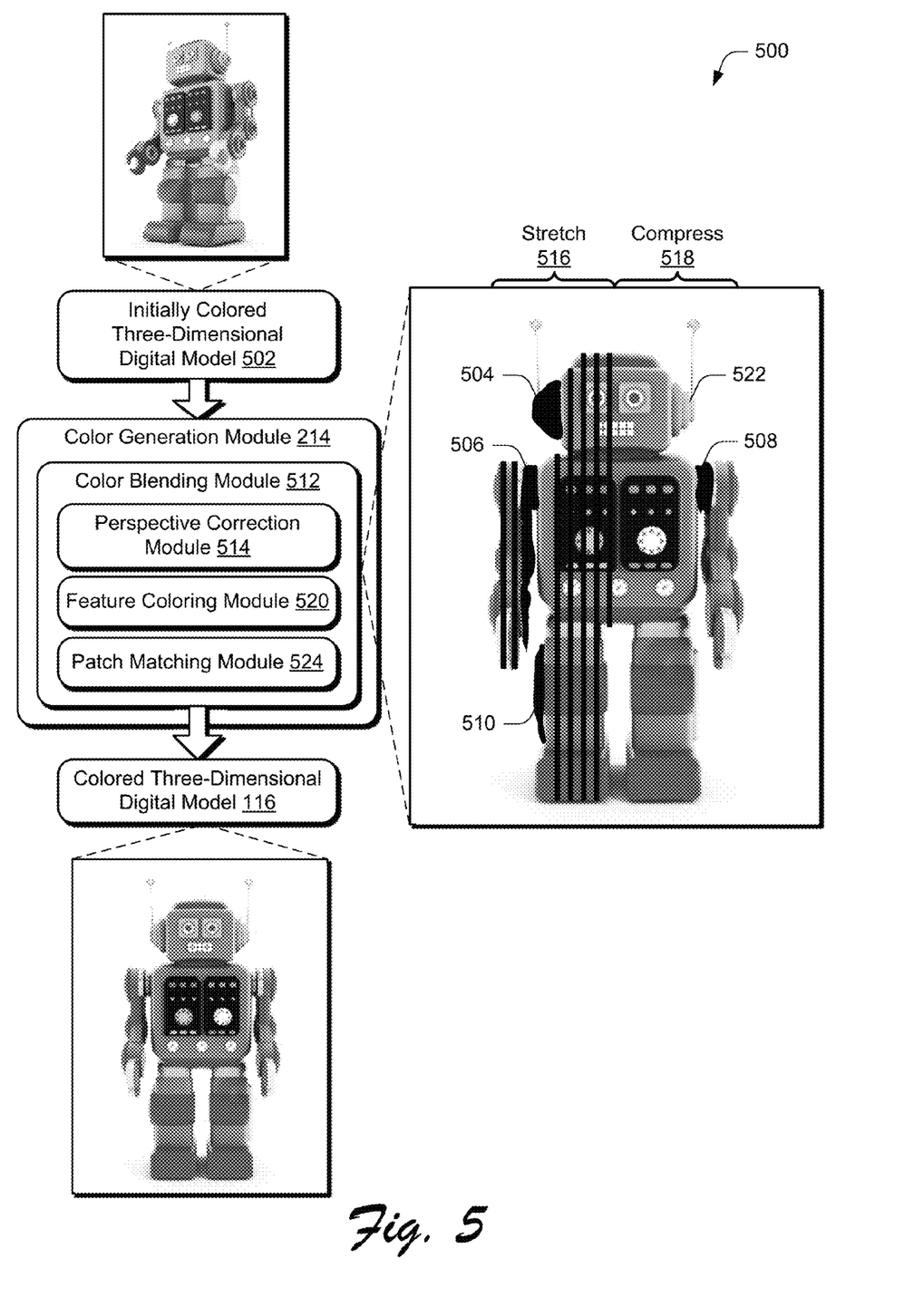
FIG. 5 depicts operation of a model coloring system to color the three-dimensional digital model.

Color is then generated by the model coloring system 122 for the three-dimensional digital model (block 810) based on the detected features to generate the colored three-dimensional digital model 116. This may be performed in a variety of ways. FIG. 5 depicts an example 500 of application of color from the two-dimensional digital image 114 to the three-dimensional digital model 120. To begin, the color generation module first generates an initially colored three-dimensional digital model 502 by aligning a perspective of the three-dimensional digital model 120 with a perspective of the physical object in the two-dimensional digital image 114. The mapped feature data 212 is then used to map colors from the digital image to the model for portions of the physical object that are viewable in the two-dimensional digital image 114.

As illustrated, this may cause portions of the initially colored three-dimensional digital model 502 to lack color. A right earpiece 504, arm joints 506, 508, and right side 510 of the right leg of the toy robot may not be viewable in the two-dimensional digital image 114 that serves as a basis for the color. This may be due to occlusion by other portions of the model, perspective, and so forth. Accordingly, a color blending module 512 is utilized by the color generation module 214 to color these missing portions, which may be performed in a variety of ways.

In a first example, a perspective correction module 514 is employed to stretch 516 and compress 518 respective portions of color obtained from the two-dimensional digital image to apply color to the portions that are not colored due to changes in perspective with respect to the model.

In another example, a feature coloring module 520 is employed to color features that are not colored in the initially colored three-dimensional digital model 502 based on similarity to features that are colored in the model, e.g., the right earpiece 504 that is not colored based on similarity to a left earpiece 522 of the toy robot. Feature similarity may also leverage stereo correspondence, e.g., to color a right side of the toy robot based on bilateral similarity of the right side to the colored left side of the toy robot in the illustrated example.

In a further example, a patch matching module 524 is employed. In patch matching, a nearest neighbor field of offsets of a patch for image similarity as a measure of distance are used for "hole filling" the missing portions of the initially colored three-dimensional digital model 502. This may be based on patches taken from colored portions of the initially colored three-dimensional digital model 502 and/or the two-dimensional digital image. Thus, the color generation module 214 may employ a variety of techniques to generate color for the colored three-dimensional digital model 116.

The colored three-dimensional digital model 116 is output by the model coloring system 122 as supporting user interaction via a user interface involving a change a viewing perspective in relation to the colored three-dimensional digital model 116 (block 812). The colored three-dimensional digital model 116 may thus support increased richness in user interactions over conventional modal techniques that required user navigation through different two-dimensional digital images to see a representation of a physical object 110 from different angles.

Figure 6:
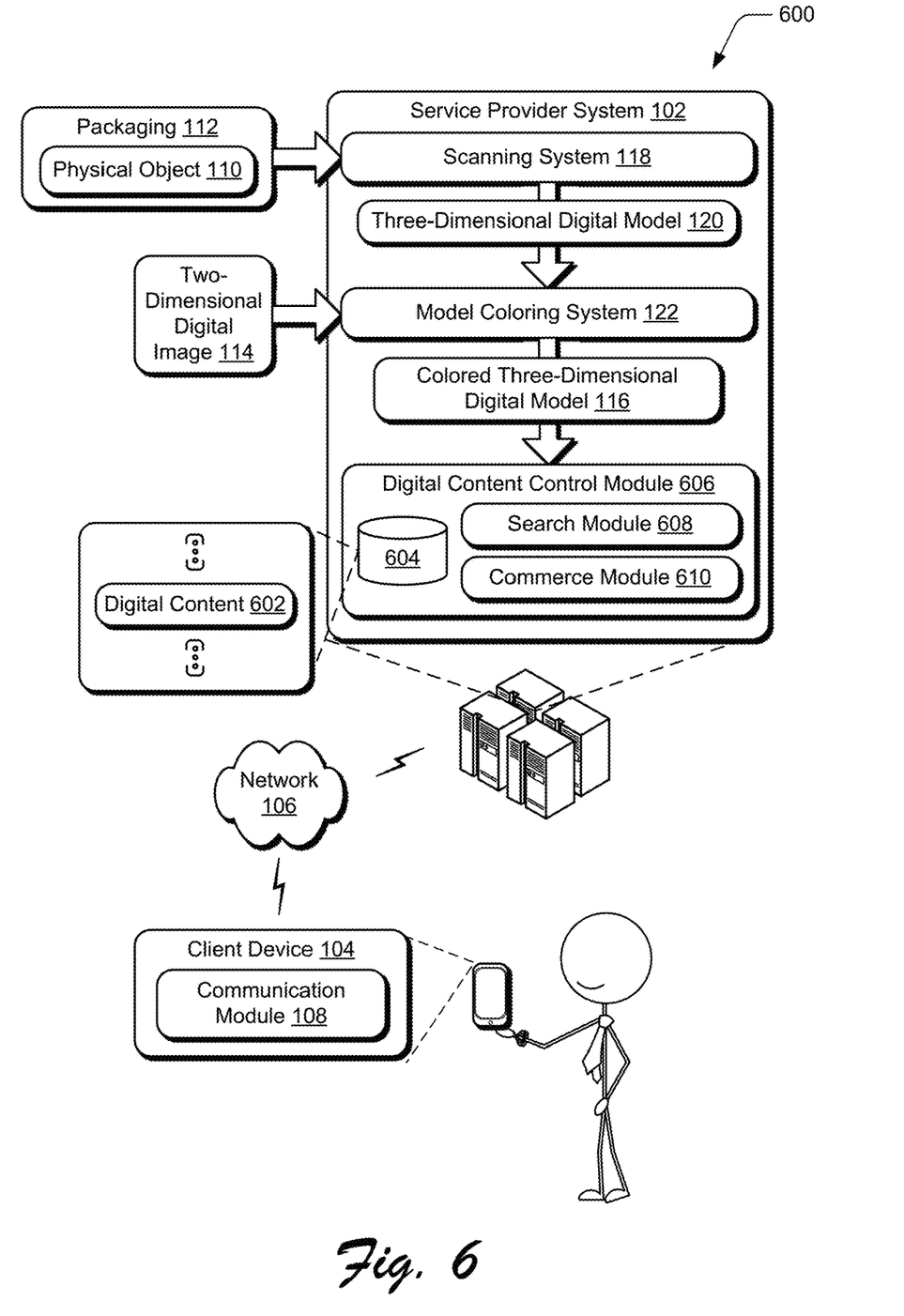
FIG. 6 depicts generation of digital content as including the three-dimensional digital model of FIG. 5.

FIG. 6 depicts an example implementation 600 in which the colored three-dimensional digital model 116 is incorporated as part of digital content. A user, for instance, may wish to offer the physical object 110 for sale. To do so, the seller interacts with the service provider system 102 over the network 106 using a client device 104 to initiate generation of digital content 602, which is illustrated as stored in a storage device 604. The digital content 602 in this example is a webpage indicating the physical object 110 is available for sale, a two-dimensional digital image 114 of the same or similar physical object, a purchase price, and includes functionality that is selectable by a buyer to initiate purchase of the physical object 110.

The user in this example ships the physical object 110, within the packaging 112, to a fulfillment center of the service provider system 102. The fulfillment center includes a scanning system 118 including a three-dimensional scanning device 202 that is usable to generate a three-dimensional digital model. The three-dimensional scanning device 202 is configured to generate scanning data 206. The scanning data 206 is used to form the model by a three-dimensional digital model generation module 208 without removing the physical object 110 from the packaging 112, thus preserving human and operational resources as well as preserving potentially desirable packaging.

A model coloring system 122 is then used to color the three-dimensional digital model 120 based at least in part on the two-dimensional digital image 114 supplied by the user. In this way, a colored three-dimensional digital model 116 may be readily generated for inclusion as part of the digital content 602, e.g., the offer to sell the physical object. As a result, the digital content 602 may include a colored three-dimensional digital model without removing the physical object from the packaging, which is not possible using conventional techniques.

The service provider system 102, for instance, may include a digital content control module 606 that is configured to manage output of the digital content 602. This may include use of a search module 608 that is configured to perform searches, whether keyword or image based, for digital content 602, e.g., to locate prospective items for purchase. The digital content control module 606 may also include a commerce module 610 representative of functionality to process payment information to initiate and complete a purchase of the physical object 110.

Figure 7A:
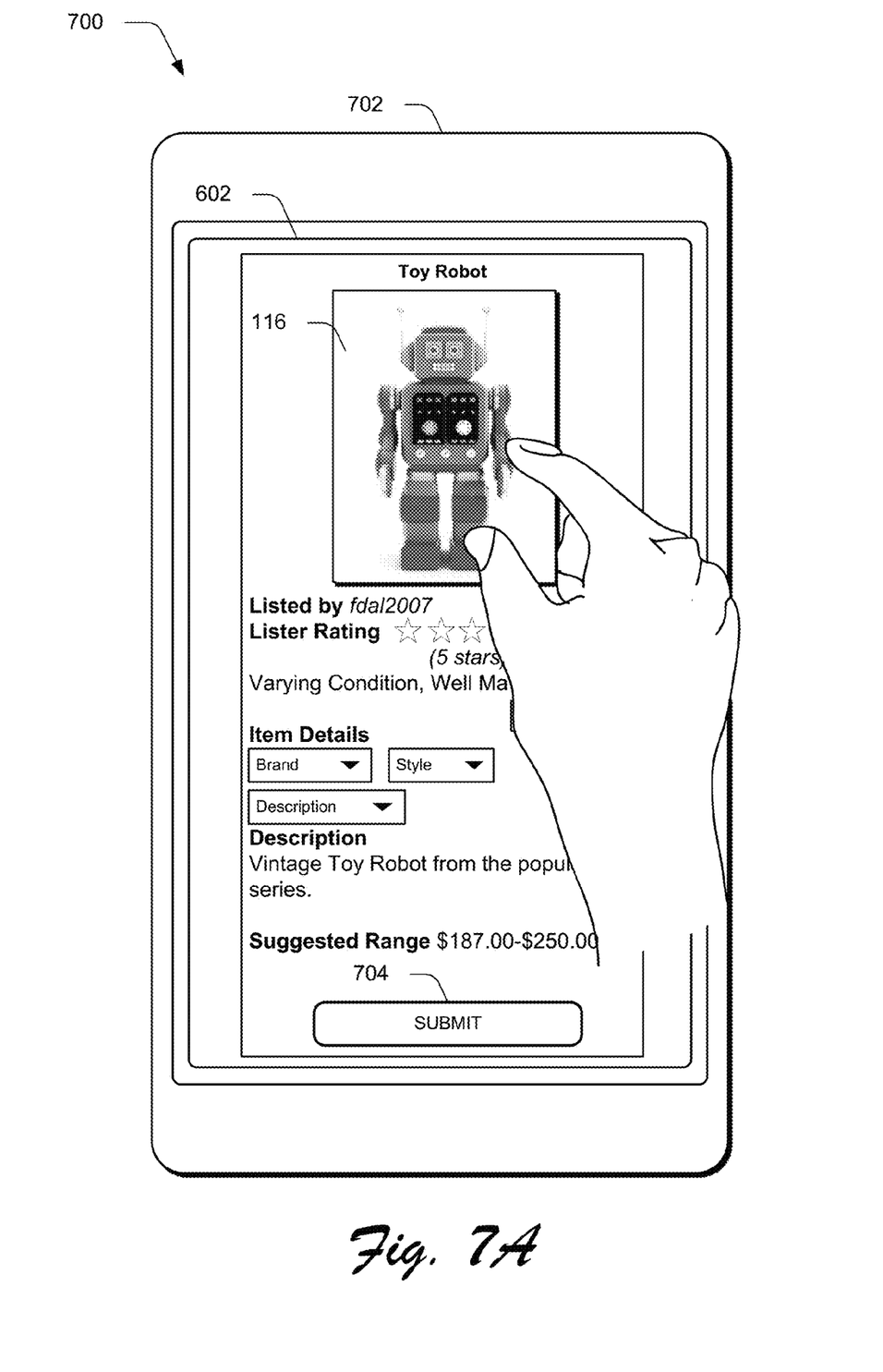
FIG. 7A depicts an example of the digital content that includes the three-dimensional digital model of FIG. 6.
Figure 8:
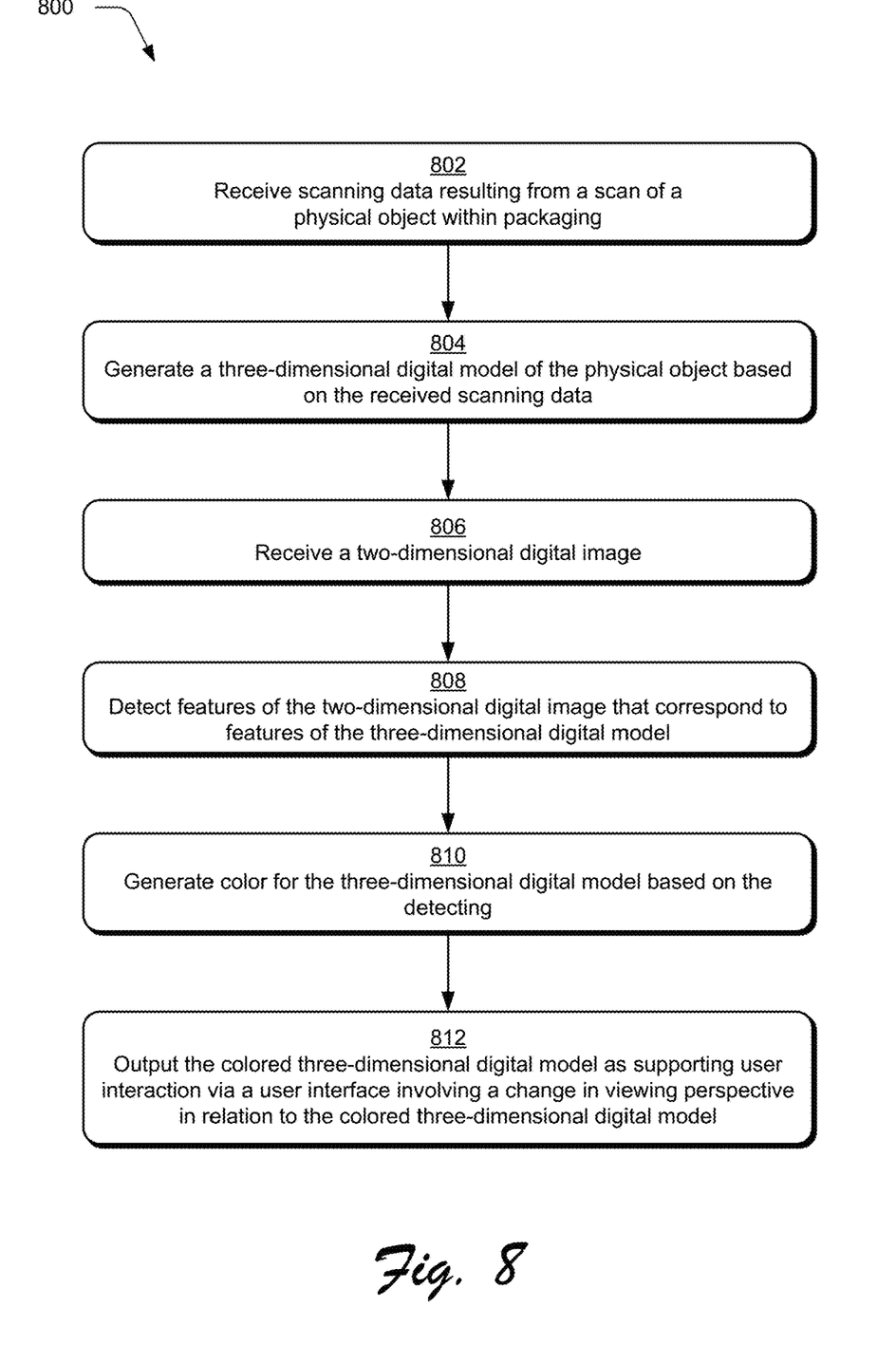
FIG. 8 is a flow diagram depicting a procedure in an example implementation of colored three-dimensional digital model generation.

FIG. 7A depicts an example implementation 700 of output of the digital content 602 as including the colored three-dimensional digital model 116. In the illustrated example, a client device 702 outputs a user interface that includes the digital content 602, e.g., via execution of a browser, a mobile application, and so forth. The digital content 602 includes the colored three-dimensional digital model 116 that supports user interaction via gestures (e.g., select-and-drag) to change perspectives (i.e., viewing angles) of the modeled physical object. The digital content 602 also includes functionality 704 to initiate a purchase of the physical object. In this way, functionality and richness of user interaction with the digital content 602 may be increased overcome the limitations of conventional techniques.

Figure 7B:
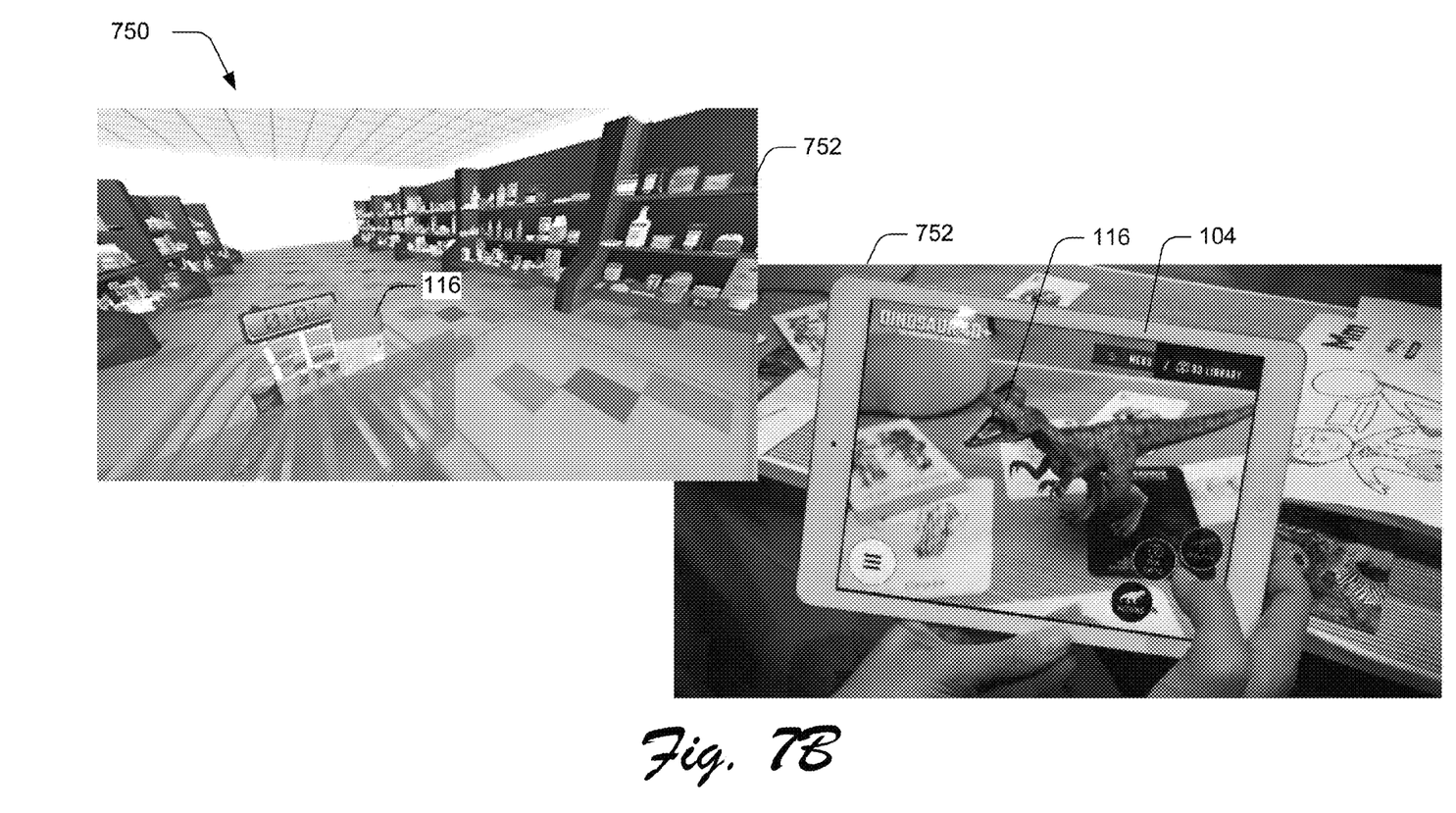
FIG. 7B depicts another example implementation of output of the digital content in virtual and augmented reality scenarios.

FIG. 7B depicts another example implementation 750 of output of the digital content in virtual and augmented reality scenarios. In a first example 752, the colored three-dimensional digital model 116 is output as virtual reality digital content as part of a virtual store. In this way, a user may navigate through the store and interaction with the colored three-dimensional digital model 116 in a natural and intuitive way. In a second example 752, the colored three-dimensional digital model 116 is output as augmented reality content that is viewable as placed on a surface of an environment of a user through the client device 104. A variety of other examples are also contemplated.

Return will now be made again to FIG. 6, as previously described the digital content control module 606 is configured to maintain the colored three-dimensional digital models 116. In one example, this includes generation of a repository of models that may be used without rescanning physical objects 110. The colored three-dimensional digital models 116, for instance, may be located using a search module 608 based on a keyword description or two-dimensional digital image 114 provided by a user to generate the digital content 602. These models may also be leveraged to support output in virtual and augmented reality scenarios, e.g., as part of a virtual shopping service. Other examples are also contemplated.

Example System and Device

Figure 9:
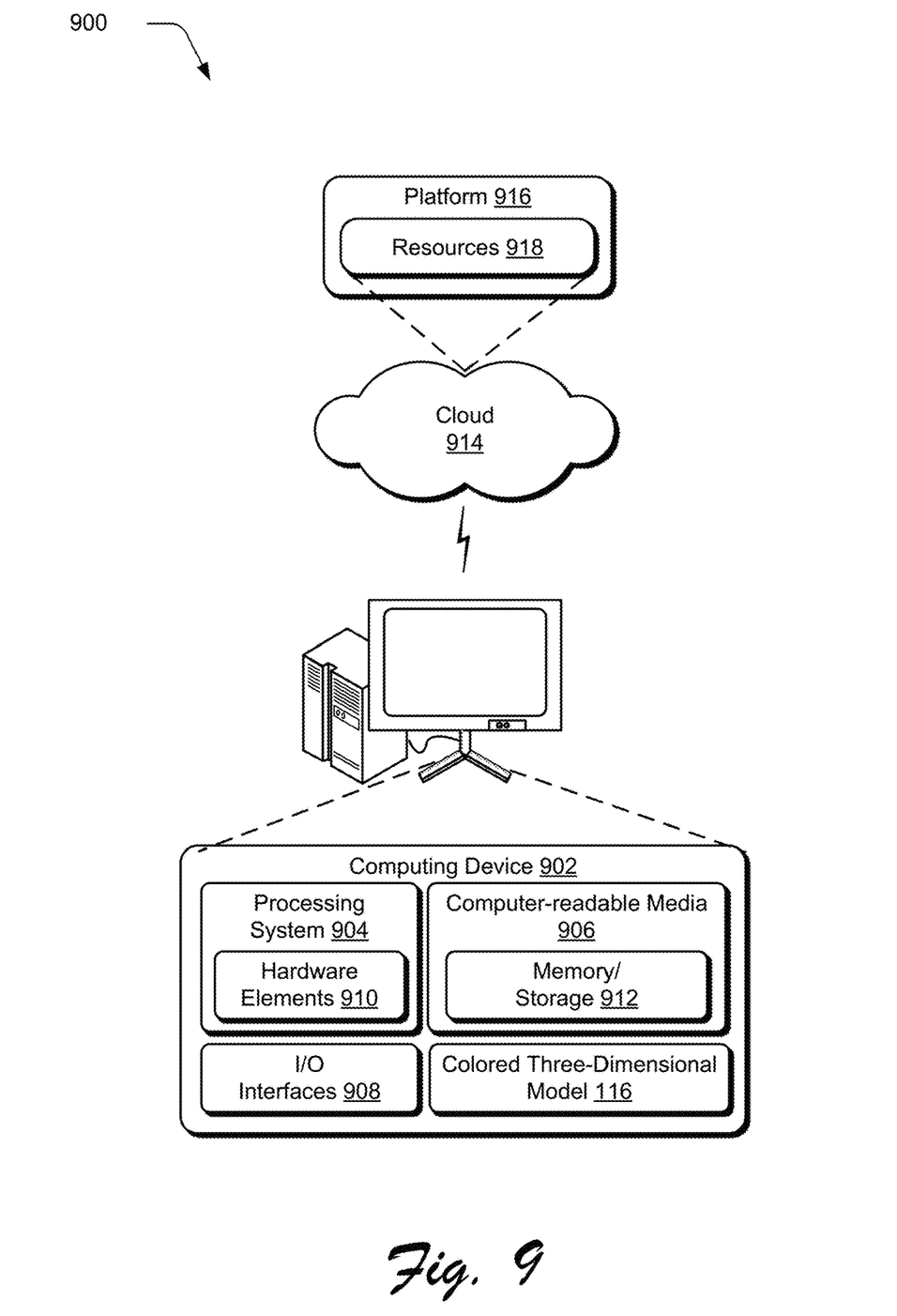
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the colored three-dimensional digital model 116. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
    receiving, by the at least one computing device, scanning data resulting from a scan by a scanner of a physical object contained within packaging, the scanner disposed out of the packaging, the scan performed by the scanner through the packaging to the physical object disposed within the packaging;
    generating, by the at least one computing device, an uncolored three-dimensional digital model of the physical object based on the received scanning data;
    detecting, by the at least one computing device, features of a digital image that correspond to features of the uncolored three-dimensional digital model;
    generating, by the at least one computing device, color for the uncolored three-dimensional digital model based on the detecting without removing the physical object contained within the packaging from the packaging; and
    outputting, by the at least one computing device, the colored three-dimensional digital model via a user interface without removing the physical object contained within the packaging from the packaging.

2. The method as described in claim 1, wherein the scan is an X-ray scan.

3. The method as described in claim 1, wherein the colored three-dimensional digital model represents the physical object without the packaging.

4. The method as described in claim 1, wherein the physical object has a density that is greater than a density of the packaging.

5. The method as described in claim 1, wherein the generating includes:
    generating an initially colored three-dimensional digital model having features that correspond to features of the digital image as colored; and
    generating color for at least one portion of the uncolored three-dimensional digital model that is not colored in the initially colored three-dimensional digital model to form the generated colored three-dimensional digital model.

6. The method as described in claim 5, wherein the generating of the color for the at least one portion that is not colored is based on detecting a different portion of the initially colored three-dimensional digital model as corresponding to the at least one portion.

7. The method as described in claim 6, wherein the correspondence is based on bilateral correspondence of the at least one portion to the different portion.

8. The method as described in claim 5, wherein the generating of the color for the at least one portion that is not colored is based on stretching color from another portion of the initially colored three-dimensional digital model as supplying the color for the at least one portion.

9. The method as described in claim 1, wherein the generating includes linear blend skinning of the digital image to the uncolored three-dimensional digital model.

10. The method as described in claim 1, wherein the generating includes stretching a portion of the digital image and compressing another portion of the digital image as aligning a perspective of the uncolored three-dimensional digital model to a perspective of the physical object in the digital image.

11. The method as described in claim 1, further comprising generating a search query based on the colored three-dimensional digital model and wherein the digital image is a search result resulting from a search performed based on the search query.

12. The method as described in claim 1, further comprising generating digital content as including the colored three-dimensional digital model and functionality that is user selectable to initiate a purchase of the physical object from a user.

13. The method as described in claim 12, wherein digital image is received via a network from the user that also initiates the generating of the digital content.

14. The method as described in claim 1, further comprising generating digital content as a webpage that includes the colored three-dimensional digital model.

15. A system comprising:
a three-dimensional scanning device disposed out of packaging and a physical object disposed within the packaging, the three-dimensional scanning device configured to generate an uncolored three-dimensional digital model by scanning the physical object disposed within the packaging, the scanning of the physical object performed through the packaging; and
a model coloring system implemented at least partially in hardware of a computing device to color the uncolored three-dimensional digital model of the physical object using a two-dimensional digital image of the physical object without removing the physical object disposed within the packaging from the packaging.

16. The system as described in claim 15, wherein the model coloring system colors the uncolored three-dimensional digital model of the physical object using the two-dimensional digital image of the physical object by:
aligning features of the two-dimensional digital image with corresponding features of the uncolored three-dimensional digital model;
generating an initially colored three-dimensional digital model based on the aligning; and
generating color for at least one portion of the initially colored three-dimensional digital model that is not colored in the initially colored three-dimensional digital model to form a generated colored three-dimensional digital model.

17. The system as described in claim 16, wherein the generating of the color for the at least one portion that is not colored is based on detecting a different portion of the initially colored three-dimensional digital model as corresponding to the at least one portion.

18. The system as described in claim 17, wherein the correspondence is based on stereo correspondence of the at least one portion to the different portion.

19. A system comprising:
a three-dimensional scanning device disposed out of packaging and a physical object disposed within the packaging, the three-dimensional scanning device configured to generate an uncolored three-dimensional digital model by scanning the physical object disposed within the packaging, the scanning of the physical object performed through the packaging;
a model coloring system implemented at least partially in hardware of a computing device to color the uncolored three-dimensional digital model of the physical object using a two-dimensional digital image of the physical object without removing the physical object disposed within the packaging from the packaging; and
a digital content control module implemented at least partially in hardware of a computing device to generate digital content as including the colored three-dimensional digital model.

20. The system as described in claim 19, wherein the digital content control module is further implemented at least partially in hardware of a computing device to output the digital content including the colored three-dimensional digital model via a user interface.

* * * * *